United States Patent Office 2,926,079
Patented Feb. 23, 1960

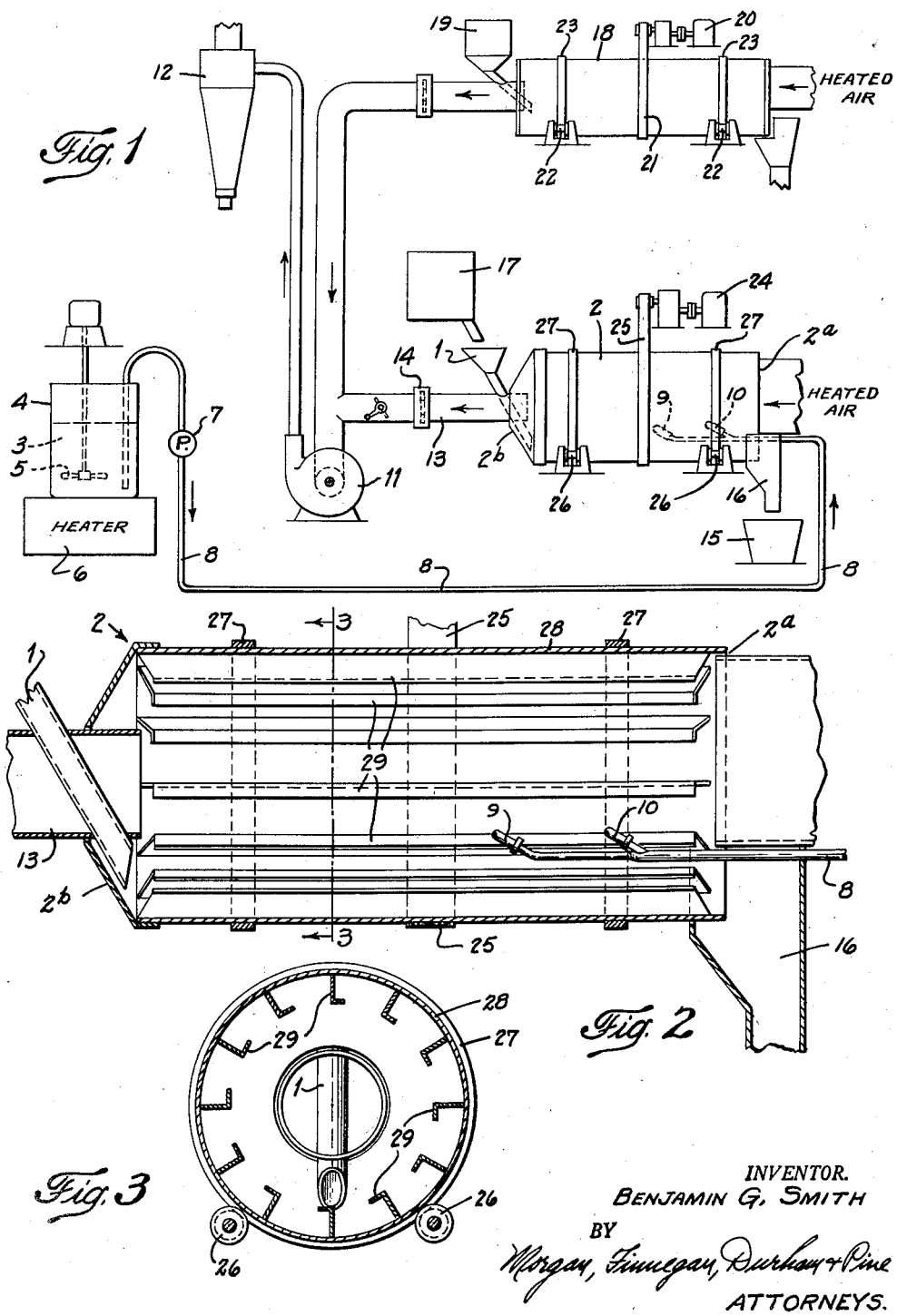

2,926,079
PROCESS FOR PRODUCTION OF FERTILIZER PELLETS

Benjamin G. Smith, Norfolk, Va., assignor to The Chemical and Industrial Corporation, Cincinnati, Ohio, a corporation of Ohio Application August 9, 1955, Serial No. 527,203

6 Claims. (Cl. 71—64)

The present invention relates to a novel process for the formation of pellets of fertilizers, fertilizer substances and the like.

Objects and advantages of the invention will be set forth in part hereinafter and in part will be obvious herefrom, or may be learned by practice with the invention, the same being realized and attained by means of the processes and steps pointed out in the appended claims.

The invention consists in the novel processes and steps herein shown and described.

An object of my invention is to provide a novel granulation process capable of producing fertilizer pellets of a more uniform size than the pellets formed by the presently known processes.

A further object of my invention is to provide a novel granulation process capable of producing uniform fertilizer pellets of a broader size range than is presently produced by the conventional granulation processes.

Another object of my invention is to provide a novel granulation process for the production of fertilizer pellets wherein a high degree of control over granulating conditions is maintained during the formation of said pellets.

A still further object of my invention is to provide a novel granulation process for the production of fertilizer pellets which is continuous and free of stoppages and losses of production due to mud formation.

Another object of my invention is to provide a novel granulation process for the production of fertilizer pellets which is more efficient, economical and simpler than present-day processes.

A still further object of my invention is to provide a novel granulation process wherein a substantial portion of the solid substance to be granulated is fed to the granulator in the form of a slurry or solution.

In the presently used processes for the formation of fertilizer pellets, the pellets are formed by "agglomeration" methods. In the agglomeration methods, dry pulverulent material of fertilizer, usually smaller than 20 mesh in size, are wetted with a wetting fluid and rolled, shaken or agitated until the particles approach the plastic state, termed the "agglomerating point." At this point the particles begin to agglomerate or adhere to form granules comprising several particles.

Difficulties arise in connection with the above-described process which present the formation of pellets of uniform size as well as undesirable results. First of all, the size of the pulverulent fertilizer material, of 20 mesh or less, makes a uniform transfer of the wetting fluid difficult if not impossible. Drops of moisture falling into a mass of this dry pulverulent material tend to roll up into balls of varying sizes rather than to disperse throughout the bed of material. This difficulty in uniformly wetting material of this size results in the formation of a wide range of granule sizes, including much oversized and undersized material. Also, there is a marked tendency during the wetting of this fine pulverulent material for the material to adhere to solid surfaces such as the granulator walls.

Another disadvantage of the foregoing agglomeration method is the difficulty of maintaining the proper moisture content during the formation of the granules. If the moisture content is too low so that the particles are insufficiently plasticized, ineffective agglomeration occurs. On the other hand, if the moisture content is too high, the particles approach a mudding state or completely coalesce into a mud, causing stoppages and losses in production. For example, an increase in moisture of about 1% over the required agglomeration moisture content will turn the mixture into a mud.

My novel process overcomes the disadvantages of the prior art processes and provides a method for forming uniform fertilizer pellets over a relatively broad size range, generally in the range of about .03 inch to about 1.5 inches in diameter and preferably from about 0.03 to 0.25 inch in diameter, with the most preferred commercial pellets being between 0.065 and 0.185 inch in diameter.

In general, my fertilizer pellets or granules are formed by wetting a bed of nuclei of fertilizer substance subjected to agitation with a slurry containing fertilizer material so as to coat the particles with said slurry while maintaining the moisture content of the nuclei bed below the agglomeration point, said moisture content being controlled by the utilization of hot gases intimately comingled with the forming granules or pellets. The dry hot gases dry the wetted nuclei particles removing the solvent of the slurry, leaving a coating of fertilizer on the nuclei particles. These steps of wetting the particles with said slurry and then drying said slurry by means of hot gases to form a coating on said particles are repeated over and over until the particles are of the desired size.

The terms "nuclei" and "slurry" as used herein will now be defined so that my present process is clearly described. The term "nuclei" relates to the fertilizer particles which are adapted to be coated with additional fertilizer material in forming the desired fertilizer pellets. Hence, the term "nuclei" as used herein relates to those fertilizer particles which are the embryos for the final fertilizer pellets, each nuclei producing one and only one final granule. The term "slurry" relates to pumpable fertilizer material adapted to be applied to a bed of nuclei, such as by spraying and to be subsequently coated thereon. The term "slurry" includes both solid material dispersed in a liquid and a solution of liquids containing substantially no solids.

The size of my nuclei is such that they will disseminate moisture before agglomeration occurs, the size of said nuclei being larger than the dry pulverulent particles used in the conventional agglomeration process. Accordingly, my nuclei are generally larger than 20 mesh to 30 mesh and always larger than 40 mesh. Advantageously, a mass of my nuclei when wetted with excess fluid will rapidly transfer and disseminate the extra moisture throughout the entire volume, and only hang together very loosely by the surface tension of the fluid. These nuclei cannot approach each other, so that there is no tendency to consolidate into a larger granule, so that mixing is easily accomplished.

With smaller particles, such as used in the prior processes, the wetting brings these tiny particles into sufficiently close contact for the mass to roll up into granules much larger than the constituent particles. This difference accounts for the ease with which my nuclei may be wetted uniformly, whereas with pulverulent material in the prior agglomeration process, the tendency of the solid impedes the process of uniform admixture.

It should be understood that a small percent of particles smaller than the required nuclei size may be present in the granulator, these particles usually being pulverized material cycled back for reprocessing. These tiny recycled particles are not in themselves nuclei as defined herein, but may be employed in the formation of nuclei by wetting these particles in a manner described hereinbelow.

The nuclei to be used in accordance with my process may be obtained by many different methods. If so desired, fertilizer particles of the desired chemical composition and size produced independent of the present process may be used. Preferably, however, the nuclei are produced by the utilization of a portion of the slurry to be later used in the coating operation. Accordingly, a portion of the slurry containing fertilizer solids is passed to the granulator and dried within the granulator, resulting in the formation of the desired nuclei on evaporation of the liquid or solvent. Also, as mentioned hereinabove, dry pulverized material, usually recycled material, may be passed to the granulator and wetted to form the nuclei by incipient granulation. It should be realized, however, that the nuclei particles already present in the granulator are not wetted to the agglomeration point, but only the smaller pulverized material which forms nuclei by incipient granulation.

At the beginning of the operation of the granulator, it is advisable to place within the granulator material of good nuclei size in order to start the process. After this, however, the recycle material fed to the granulator is generally not of nuclei size as used herein. Generally, this material forms nuclei particles by incipient agglomeration, although a small portion of the recycle material may be of sufficient size to act as nuclei. The nuclei bed comprising nuclei particles is subjected to agitation and wetted with slurry containing fertilizer material. This slurry preferably contains a substantial portion of the solid fertilizer raw materials which are subsequently coated on the nuclei particles. Thus, a substantial portion of the fertilizer raw material is introduced in the slurry with the remaining portion of the final fertilizer pellet being the fertilizer substance forming the nuclei. Hence, the present process is different from the prior processes, wherein the fertilizer solids are directly granulated by the addition of a few percents of moisture (5-15%). By incorporating a substantial amount of the raw fertilizer material in the form of a slurry and subsequently coating the raw materials on the fertilizer nuclei, process control and product quality have been found to be sufficiently benefited to more than compensate for any increased drying cost derived from the formation of the raw material into a slurry.

The slurry is preferably sprayed on the nuclei bed to give a uniform wetting of the particles. Any fertilizer formulation that can be made into a pumpable slurry can be satisfactorily granulated in my process. The temperature of the slurry is not critical and is controlled only to provide a slurry of satisfactory pumping characteristics.

I have found that a most important factor in obtaining uniform pellets is that the moisture content of the granulating bed be below that critical moisture at which agglomeration occurs. By "moisture content of the granulating bed" is meant the percentage of fluid phase present in the wetted bed, whether or not the moisture comes from the slurry applied to the nuclei bed or the moisture that may be derived from the nuclei itself. In other words, it is the liquid and the dissolved solids and not just the moisture present in the slurry added. For instance, in the granulation of a fertilizer consisting of 40% ammonium nitrate, 23% potassium chloride and 37% limestone, the percentage of water is only 4% at the agglomerating point, whereas the percentage of fluid phase is 20%. This difference is due to the solution of soluble salts within the water to increase the weight of fluid, decrease the weight of solid, and so increase the percentage of fluid phase in the mixture that is termed the moisture of the granulating bed.

The addition of slurry to the bed of solids in the granulator and the simultaneous evaporation of liquid define a certain moisture content of the granulating bed. As mentioned hereinabove, there is a maximum bed moisture above which agglomeration occurs, giving oversized particles. Thus, the moisture content must be low enough that particle build-up is formed not by agglomeration but by the formation of coatings on the wetted particles by the evaporation of the solvent of the slurry applied to the particles.

It will be well understood by those skilled in the field that the critical moisture content for different fertilizers will vary depending upon the chemical composition of the fertilizer. The moisture content necessary to produce agglomeration for any particular fertilizer can be accurately ascertained in the laboratory and is referred to as "agglomerating moisture."

One method for determining the agglomeration point is as follows:

To each of 6 samples in 100 ml. Erlenmeyer flasks consisting of 40 grams each of the material whose agglomeration point is to be determined, add water accurately from a burette so as to form a series of samples of moisture contents in the vicinity of the agglomeration point, and different by ½ percent of moisture. Seal the mouth of each flask with a close fitting rubber stopper and shake violently for four minutes with intermittent tapping on the table to loosen adhering solids. Pour the samples into separate watch glasses, and arrange in order of ascending moisture content. If the agglomeration moisture has been included in the samples, there will be a marked change in the appearance of the material with this moisture content. At this moisture, material will have rolled into glistening round balls of 10 mesh and greater in diameter, and all the samples of greater moisture content will either be muddy or contain larger more plastic granules. This experiment may be performed at any temperature desired so as to determine the agglomeration point of the material at elevated temperatures as well as room temperature.

In applying the present invention to a particular fertilizer, therefore, the moisture of the granulating bed of said fertilizer should be below the "agglomeration moisture" for that fertilizer. Only when the bed moisture approaches the agglomerating point does it become critical. It follows that an important element in my process is the control of the moisture content in the granulating bed so that it does not reach the agglomerating point. Operation at lower bed moistures produces granules of smaller size, dryer material and usually more angular in shape, while increasing the bed moisture increases the size and spheroidicity of the granules.

The moisture content of the granulating bed is controlled by intimately co-mingling hot dry gases with the granulating bed. Generally, the hot gas temperatures are those that would be used in the normal operation of a rotary drier for drying the fertilizer material. Of course, the particular temperature of a drying gas or gases will vary depending upon the temperature needed to maintain the moisture content of the nuclei bed below the agglomeration point. I have found the regulation gas temperature to be generally in the range of 250° F.–1000° F. Preferably, the nuclei particles are showered through the hot gases, since it is imperative both for control and process efficiency that the bed material be intimately co-mingled with the hot drying gases. Care should be used so that the temperature of the gases is sufficiently low to avoid deterioration of the fertilizer raw materials. In addition to the foregoing mentioned dryer, other suitable apparatus that may be used for obtaining adequate contacting of the nuclei with hot gases are the Roto-louvre Dryer, Multilouvre Dryer and Fluo-solids Reactors.

The particle beds to be used in accordance with my process are continuously agitated or shaken, etc. This aids in the co-mingling of the particles and the hot gases, while at the same time aiding in the mixing of the slurry with the forming particles.

The temperature of the nuclei bed is a function of the wetness or percentage of fluid phase present in the bed. For satisfactory operation of the granulator, it should be between the wet-bulb temperature of the exit gases and about 50 degrees above the maximum boiling point of the liquid in the slurry. Generally, the temperature of the bed material within the granulator varies from 150° to 260° F. Since this temperature is a function of the wetness or percentage of fluid phase present in the bed, it is useful in indicating when the fluid phase percentage reaches its critical or agglomeration moisture content. Operation at bed temperatures below about 140° F. results in excess wetting of the mass and loss of control. It is not the low temperature that causes such difficulty, but rather the excess of bed wetness which is measured by the bed temperature.

I have found that the range of moisture content of the slurry may vary in so far as pellet formation is concerned. It is necessary for the slurry to contain sufficient moisture for adequate pumpability. Amounts higher than this may be used but would result in higher drying costs, since on the addition of slurry to the bed of solids in the granulator, sufficient heat must be produced by the hot drying gases that there is a simultaneous evaporation of a sufficient amount of moisture in the slurry that the moisture content of the bed does not reach the agglomeration point.

Based on my foregoing description, therefore, it is seen that the paramount requirements in my process are:

(1) Bed moistures are maintained below the agglomeration point.

(2) A substantial portion of the raw materials are introduced as a slurry.

(3) Treatment of dry pulverulent material is minimized.

(4) The "in process' material must be continuously agitated or rolled.

(5) Hot gases are intimately co-mingled with the forming granules.

It should be further realized that the quality of granules produced varies depending on such conditions as the variation of rate of slurry addition to each section of the granulator, variation of inlet gas temperature, variation of inlet gas flow, variation of recycle rate, spray drying of slurry within the granulator and control of initial wetting process.

Pellets produced in accordance with my invention have varied from 1.5 to 0.03 inches. Pellets of even larger size may be produced if so desired, as there is no problem in producing pellets larger than 1.5 inch in diameter. With respect to pellets less than 0.03 inch in diameter, a problem does arrive, however, due to the small size of the nuclei used in forming the pellets and in particular to the uniform wetting of said nuclei, for reasons already described in detail hereinbefore.

The present process may be used in producing fertilizer pellets of any desired chemical compositions. As is well known to those skilled in the field, a fertilizer is commonly designated by a three number system, such as 3-9-6, these digits representing respectively the percentage of nitrogen, phosphorus as percent phosphorus pentoxide and potassium as percent potash, present in the fertilizer. Thus a 3-9-6 fertilizer represents a fertilizer containing 3% nitrogen, 9% phosphorus pentoxide (generally termed phosphate) and 6% potash. Examples of typical fertilizer compositions useful in the present process are given below, with the parts by weight of the ingredients used in producing the fertilizer being shown.

EXAMPLE 1

*14-0-14 grade*

452 lbs. potassium chloride
800 lbs. ammonium nitrate
748 lbs. dolomitic lime

EXAMPLE 2

*14-0-14 grade*

452 lbs. potassium chloride
1287 lbs. ammonium sulfate
261 lbs. dolomitic lime

EXAMPLE 3

*14-0-14 grade*

452 lbs. potassium chloride
609 lbs. urea
939 lbs. ground gypsum

EXAMPLE 4

*20-0-20 grade*

645 lbs. potassium chloride
1143 lbs. ammonium nitrate
212 lbs. dolomitic limestone

EXAMPLE 5

*10-10-10 grade*

323 lbs. potassium chloride
1010 lbs. superphosphate
67 lbs. ammonia
143 lbs. ammonium nitrate
437 lbs. ammonium sulfate
20 lbs. dolomitic limestone

EXAMPLE 6

*5-10-5 grade*

162 lbs. potassium chloride
1010 lbs. superphosphate
33 lbs. ammonia
72 lbs. ammonium nitrate
218 lbs. ammonium sulfate
505 lbs. dolomitic limestone

EXAMPLE 7

*8-0-24 grade*

216 lbs. potassium chloride
457 lbs. ammonium nitrate
679 lbs. potassium sulfate
648 lbs. dolomitic limestone As shown by the foregoing examples, a particular grade fertilizer may be made from different formulas, as illustrated by the above 14-0-14 grade of fertilizer obtained in Examples 1, 2 and 3, each of the formulas in said examples being of a different chemical composition. Also, the agglomeration points for each formula will also be different.

In Table I below there are shown agglomeration points for a number of the fertilizers of the foregoing examples, said agglomeration points having been determined by the method described in detail hereinbefore.

TABLE I

| Formula No. | Fertilizer Grade | Granulating point in percent water |
| --- | --- | --- |
| VI | 5-10-5 | 11.3% at 70° F. |
| V | 10-10-10 | 9.2% at 70° F. |
| I | 14-0-14 | 5.6% at 70° F. |
| IV | 20-0-20 | 5.2% at 60° F. |
| VII | 9-0-24 | 8.0% at 70° F. |

In order to describe my process even further, reference is now made to the accompanying drawings.

Fig. 1 represents a diagrammatic view of one arrangement for carrying out the process described herein.

Fig. 2 is a longitudinal sectional view of the granulator shown in Fig. 1.

Fig. 3 is a transverse sectional view taken on the line 3—3 of Fig. 2.

Referring to the drawings, solid feed consisting of recycled and other solids is passed from feeder 1 to granulator 2 to form a nuclei bed in said granulator. A slurry 3 containing fertilizer raw materials, to be coated on the nuclei, is mixed in mixing and holding tank 4 by stirrer 5, the slurry being heated to the desired temperature by heater 6.

The slurry is then pumped by means of pump 7 through line 8, where it is sprayed over the nuclei bed through nozzles 9 and 10. The moisture content of the nuclei bed is controlled by passing hot gas or a mixture of hot gases through granulator 2. The hot gas enters at inlet end 2ᵃ and exists at the opposite conical end 2ᵇ of the granulator, the wetted nuclei bed being showered through the hot drying gas. Suction is provided at the gas exit end of the granulator by means of blower 11 to aid in the withdrawal of the exit gas from the granulator. Preferably, blower 11 is connected to a cyclone separator 12 for the removal of fine particles present in the exit gases passing from the granulator to the blower 11 through line 13. A damper valve 14 is provided for controlling the flow of exit gas.

The nuclei coated material formed in granulator is collected in the product receptacle 15 through discharge hopper 16. The sizes that are too coarse are ground, and with the too small size are transferred to recycle receptacle 17, and in turn passed to hopper or feeder 1.

Preferably, a dryer 18 is provided to condition the formed granules fed thereto through feeder 19. The dryer may be of the small-scale rotary granulator belt driven by means of motor 20 and belt 21. The dryer is rotatably supported on rollers 22 by means of bands 23 supported on said dryer and in contact with said rollers. Hot gases similar to those blown through the granulator are coursed through the dryer.

Granulator 2 is of the conventional rotary design, being belt-driven by means of motor 24 and belt 25. The granulator is notatably supported on rollers 26 by means of bands 27 supported on said granulator and in contact with said rollers.

As shown in Fig. 2, the granulator 2 comprises a cylindrical shell 28 mounted with its axis about horizontal. Preferably, there is provided a slight downward slope, such as ⅛ inch per foot of length toward the gas inlet end 2ᵃ to expedite the exit of solid granules to discharge hopper 16. The granulator is provided with a plurality of flights 29 of sufficient capacity to lift the nuclei bed material, as, for example, an average of twice per revolution. Preferably, the exit end 2ᵇ of the granulator is conical to effect a better seal to the exhaust system. The flights 29 are cut off at short distance from the ends of the granulator in order to prevent end effects determining the discharge rate of the granulator.

In operation, slurry is continuously sprayed into the granulator through nozzles 9 and 10 at a short distance within the flight area. The granulator rotates at a suitable speed, such as 16 r.p.m. to shower the solid nuclei bed through the spray of slurry and the hot gases containing the products of combustion of fuel oil and air continuously blown through the granulator for distilling off the solvent of the slurry, leaving the desired nuclei coated fertilizer pellets.

I have found it advisable at predetermined intervals, such as every fifteen minutes, to make a sieve analysis of the granulator effluent. The amount of recycle is calculated from this and the weight of through-put obtained. This calculated weight of recycled material is ground and continuously returned to the granulator from recycle receptacle 17 to hopper 1. This method of introducing recycle material, as called for by the sieve analysis, is called the natural recycle rate.

I have prepared a number of fertilizer pellets in accordance with the foregoing process, as illustrated by the following examples:

EXAMPLE 8

This example illustrates the preparation of fertilizer pellets from the fertilizer composition of Example 1 of 14–0–14 grade.

A bed of nuclei (from recycle material and from dried spray) of 14–0–14 grade and having a sieve analysis +10 mesh 9%, −10 to +30 mesh, 89.7%, −30 mesh, 1.3% was sprayed with a slurry at a temperature of 95° F., comprising 79% of 14–0–14 fertilizer and 21% water (all suspended matter was under 12 mesh and no wetting or dispersing agents were added) under the following operating conditions:

Bed moisture _____percent__ 0.75
Bed temperature _____° F__ 182
Inlet gas temp. _____° F__ 360
Outlet gas temp. _____° F__ 204

At the end of 3¾ hours' running time, the following results were obtained:

Production rate (granulator affluent-recycled material): 32 lbs./hr. of dried sized product of −4 mesh to −16 mesh
Hold-up weight: 72 lbs.
Granulator affluent:
    Rate—40.8 lbs. per hour
    Composition analysis—
        99.6% 14–0–14
        .4% moisture
    Sieve analysis—
        +4 mesh, 15.8%
        −4 mesh +5 mesh, 12.6
        −5 mesh +10 mesh, 70.3
        −10 mesh, 1.3
Recycled material:
    Rate—approximately equal to +4 mesh and −10 mesh material produced; 8.8 lbs./hr.
    Composition analysis—
        99.6% 14–0–14
        .4 moisture
    Sieve analysis—all material ground to 100% minus 10 mesh Operating data and resulting data from three additional runs are shown below in Examples 9–11.

EXAMPLE 9

Material granulated: 14–0–14 of Example 1
Production rate: 41½ lbs./hr. of dried sized (−4 mesh, −16 mesh) product
Running time: 6¼ hours
Hold-up weight: 68 lbs.
Slurry feed: Sprayed through an air atomizing nozzle and directed on the third fifth and fourth fifth of the granulating bed
Slurry:
    Composition analysis—
        14–0–14, 81%
        Water, 19%
    All suspended matter, minus 12 mesh
    Temperature, 85° F.
Granulator affluent:
    Rate—41½ lbs./hr.
    Composition analysis—same as run 31
    Sieve analysis—
        +4 mesh, 0.7%
        −4 mesh +5 mesh, 1.6%
        −5 mesh +10 mesh, 89.8%
        −10 mesh +16 mesh, 7.7%
        −16 mesh, 0.2%
Recycled material: None
Nuclei material: Dried spray of same composition as the product or granulator effluent
Operating conditions:
    Bed moisture, 0.40%

Operating conditions—Continued
Bed temperature, 220° F.
Inlet gas temperature, 420° F.
Outlet gas temperature, 220° F.
Gas flow rate, 460 lbs./hr.

EXAMPLE 10

Material granulated: 15-15-15 of Example 3
Production rate: 22 lbs./hr. of dried sized product (—4 mesh —16 mesh)
Running time: 4½ hours
Hold-up weight: 46 lbs.
Slurry feed: Sprayed through an air atomizing nozzle directed onto the second third of the granulator bed
Slurry:
    Composition analysis—
        15-15-15, 60%
        Water, 40%
    All suspended matter, less than 12 mesh
    Slurry temperature, 115° F.
Granulator effluent:
    Rate—26.4 lbs./hr.
    Composition—
        15-15-15, 97.3%
        Moisture, 2.7%
    Sieve analysis—
        +4 mesh, 4.0%
        —4 mesh +5 mesh, 3.8%
        —5 mesh +10 mesh, 88.7%
        —10 mesh, 3.3%
Recycled material:
    Rate—4.4 lbs./hr. (all material less than 10 mesh or greater than 8 mesh)
    Composition—Same as granulator effluent
Product:
    Composition—Same as granulator effluent
    Sieve analysis—100% minus 8 mesh and plus 10 mesh
Nuclei material: Composition same as product supplied by dried spray and recycled material
Operating conditions:
    Bed moisture, not taken
    Bed temperature, 231° F.
    Inlet gas temperature, 340° F.
    Outlet gas temperature, 240° F.
    Gas flow rate, 535 lbs./hr.

EXAMPLE 11

Material granulated: 20-0-20 of Example 4
Production rate: 40 lbs./hr. of dried sized product (—4 mesh +10 mesh)
Running time: 6¼ hours
Hold-up weight: 65 lbs.
Slurry feed: Sprayed through an air atomizing nozzle onto the second third of the granulator bed material
Slurry:
    Composition analysis—
        20-0-20, 83%
        Water, 17%
    All suspended matter was minus 12 mesh
    Slurry temperature, 85-90° F.
Granulator effluent:
    Rate—56 lbs./hr.
    Composition—
        20-0-20, 99.7%
        Water, .3%
    Sieve analysis—
        +4 mesh, 5.9%
        —4 mesh +5 mesh, 13.2%
        —5 mesh +10 mesh, 76.8%
        —10 mesh, 4.1%
Recycled material: 16 lbs./hr. (all material +5 mesh or —10 mesh)
Product:
    Composition—Same as granulator effluent
    Sieve analysis—100% —5 mesh +10 mesh
Nuclei material:
    Composition—Same as granulator effluent
    Sieve sizes—100% —10 mesh +30 mesh
Operating conditions:
    Bed moisture, approx. 0.2%
    Bed temperature, 195° F.
    Inlet gas temperature, 390° F.
    Outlet gas temperature, 193° F.
    Gas flow, 405 lbs./hr.

The invention in its broader aspects is not limited to the specific steps and processes described but departures may be made therefrom within the scope of the accompanying claims without departing from the principles of the invention and without sacrificing its chief advantages.

I claim:

1. A continuous process for the formation of rounded and substantially smooth fertilizer pellets of substantially uniform size and at least 0.03 inch–1.5 inch in diameter by coating large nuclei in substantially individualized condition with a slurry containing a substantial amount of fertilizer solids and wherein agglomeration between coated, uncoated nuclei and fertilizer solids present in said slurry is substantially prevented, the steps comprising essentially treating a bed of nuclei of a fertilizer substance having a particle size of at least about 40 mesh and a moisture content below the agglomeration point in a chamber with constant agitation to produce a physical separation of a substantial portion of said nuclei from each other, passing said separated nuclei through a hot gaseous atmosphere containing an aqueous slurry of fertilizer substances in the form of fine droplets wherein the separated nuclei are contacted and coated with said fine droplets of fertilizer slurry, the moisture content at the surfaces of said coated nuclei being raised above the agglomeration point and then simultaneously and rapidly drying said coated and substantially separated nuclei to a moisture content below the agglomeration point, by passing hot drying gases, having a temperature sufficient so as to control the moisture content of the granulating bed and avoid deterioration of the fertilizer solids in said slurry, through said chamber and before said separated and coated nuclei start agglomerating, the coated nuclei being showered through said hot drying gases, and then recovering a substantially rounded and uniform product of said above desired size.

2. The process claimed in claim 1 wherein the aqueous slurry is sprayed in the gaseous atmosphere, and said spray contacts the separated nuclei.

3. The process claimed in claim 1 wherein the quantity of slurry so introduced is sufficient to produce finished pellets consisting preponderantly of solids derived from said slurry.

4. The process claimed in claim 1 wherein nuclei particles to be coated are provided in part at least in said chamber by recycling effluent fines and ground oversize effluent to the said chamber.

5. The process claimed in claim 1 wherein said fertilizer substance comprises ammonium nitrate.

6. The process claimed in claim 1 wherein a substantial portion of the nuclei in said chamber is continuously provided by the drying of droplets of said slurry.

References Cited in the file of this patent

UNITED STATES PATENTS

| | | |
|---|---|---|
| 1,957,314 | Billing et al. | May 1, 1934 |
| 2,041,088 | Pfirrmann | May 19, 1936 |
| 2,136,793 | Gabeler et al. | Nov. 15, 1938 |
| 2,228,704 | Offutt | Jan. 14, 1941 |
| 2,436,771 | Hood | Feb. 24, 1948 |
| 2,448,126 | Shoeld | Aug. 31, 1948 |
| 2,598,658 | Procter et al. | May 27, 1952 |
| 2,600,253 | Lutz | June 10, 1952 |
| 2,631,084 | Robinson | Mar. 10, 1953 |
| 2,739,886 | Facer | Mar. 27, 1956 |